United States Patent Office 3,268,333
Patented August 23, 1966

3,268,333
HIGH GAIN DRY PHOTOGRAPHIC SYSTEM
Charles E. Allman and Alfred H. Sporer, San Jose, Calif., assignors to International Business Machines Corporation, New York, N.Y., a corporation of New York
No Drawing. Filed Dec. 30, 1963, Ser. No. 334,547
18 Claims. (Cl. 96—27)

This application is a continuation-in-part of our copending United States patent application, Ser. No. 46,903, filed on Aug. 2, 1960, now abandoned, for High Gain Dry Linear Polyketone Photographic System.

Our invention relates to photographic materials and to processes for their preparation and use. More particularly, our invention relates to films and other objects containing halogenated materials capable of decomposing to form a hydrogen halide on exposure to light and, as the principal color forming agent, a linear polyketone.

United States Patent No. 2,712,996 describes materials and a process wherein a polyhalogenated substance is degraded by actinic light to form ethylenically unsaturated conjugated color bodies and a halogen acid. The halogen acid is reacted with a sequestering agent to prevent a recombination of the acid with the conjugated polymer. The image is fixed by heating the polymer in the presence of a heat sensitive material which combines with the thermal decomposition products to prevent further unsaturation of the polymer.

We have now discovered a dry type photosensitive material containing a substance which decomposes or degrades to yield a hydrogen halide on exposure to light and a polymeric ketone capable of aldol condensation in the presence of a hydrogen halide at elevated temperatures. In certain instances, the polyketone can also be the hydrogen halide donor.

Our improved photographic materials can be exposed in about one-half the time and developed in about one-tenth the time required by prior art films. The image formed in our photographic films is more stable than images formed in prior art films, because the polymeric ketone reaction is substantially irreversible in contrast to the more reversible dehydrohalogenation reaction utilized in the prior art materials.

Our photographic materials are utilized by exposing the film or other object to light through a stencil to form a hydrogen halide by photodegradation. The released hydrogen halide is, in a sense, a latent image. The image is developed by heating the polyketone to temperatures in excess of ambient room temperatures in the presence of the hydrogen halide. The hydrogen halide catalyzes an aldol condensation in the ketone polymer.

Polyketones useful in our photographic materials are those having a repeating radical of the structural formula:

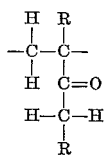

wherein R is selected from the group consisting of hydrogen and lower alkyl, and those having a repeating radical of the structural formula:

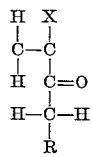

wherein X is halogen.

These polymers are prepared from monomers having the structural formula:

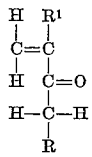

wherein $R^1$ is selected from the group consisting of hydrogen, halogen and lower alkyl.

Monomers having this structural formula include methyl vinyl ketone, ethyl vinyl ketone, methyl isopropenyl ketone, methyl isobutenyl ketone, ethyl isopropenyl ketone, methyl-2-chlorovinyl ketone, methyl-2-bromovinyl ketone, ethyl-2-chlorovinyl ketone, and methyl-2-chloro-1-butenyl ketone. We prefer to utilize polyhalo polymers prepared from the monomers methyl-2-chlorovinyl ketone, methyl-2-fluorovinyl ketone, and methyl-2-bromovinyl ketone in instances where a halo polyketone is the principal color forming agent, though other halogenated donors can be included with these polyhalo polyketones. Methyl vinyl ketone and methyl isopropenyl ketone are the preferred nonhalogenated polyketones. Mixtures of polyhalogenated and nonhalogenated polyketones can be used in our photosensitive materials.

Hydrogen halide precursors useful in our process are those materials which react, decompose or degrade within our system on exposure to light to form a hydrogen halide. Herein, the terms "react," "degrade" and "decompose" are meant to be encompassed by the word "decompose." Many such compounds are known to the art and include compounds such as N-bromosuccinimide, ethylene chloride, ethylene dichloride, pentabromo ethane, bromoform, carbon tetrabromide, bromo-chloro derivatives of carbon tetrahalides such as bromotrichloromethane, polyhalogenated long chain hydrocarbons such as those sold under the trademark "Halowax," and fatty acids, and polymers such as those formed from the monomers vinyl chloride, vinylidene chloride, chloroprene, vinylbromide, and chlorofluoroethylene. We believe that the presence of atmospheric oxygen usually suffices to cause good yields of hydrogen halides to form from compounds such as ethylene chloride on exposure to light, but additional oxygen may be entrained in the photographic material. We prefer to use hydrogen chloride and hydrogen bromide donors in our photographic materials, though hydrogen fluoride and hydrogen iodide donor compounds analogous to those described above can also be used to advantage under extreme conditions of irradiation. Specifically, we prefer to use the compounds carbon tetrabromide and polymers or co-polymers formed from the monomers vinyl chloride and vinylidene chloride and analogs of this compound and these polymers.

When a carbon tetrahalide, such as bromotrichloromethane and the preferred carbon tetrabromide, is used as the hydrogen halide precursor, it is desirable but not required, to include hydrogen donating compound having a hydrogen which is easily extractible by a halide free radical. This type of compound should contain a carbon atom on which there is only one hydrogen and the remaining groups are aryl radicals or should be a compound having a hydrogen in an allylic position. The structural formula of an example compound of the latter type is—

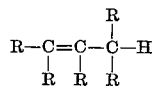

where R is either an aryl or alkyl group. Examples of these hydrogen donating compounds are 1-octene and triphenylmethane with the latter being preferred. It will be apparent from the above definition that, after donating the hydrogen, the hydrogen donor is substantially stable and unreactive as a free radical. It further will be apparent that these hydrogen donating compounds may be used with hydrogen halide precursor other than the carbon tetrahalides.

The amount of hydrogen halide releasing materials utilized in our photosensitive systems depends on the intensity of the light to which the compositions are to be exposed, the desired color density of the final conjugated polymers, the desired developing temperature and time, the particular hydrogen halide releasing compounds, plasticizers, and the solvents which may be utilized in the compositions. At less than about 0.1% of hydrogen halide (of the total weight hydrogen halide donor exposed to light) is released, the total amount of hydrogen halide precursors may run from about 1% to about 90% of the total weight of our photographic materials. Preferably, we utilize from about 10% to about 75% hydrogen halide precursors.

The addition of one or more of a number of sensitizers to our photographic materials increases the quanta of light absorbed by the materials without causing any deleterious effects to the aldol condensation of the polyketone, thereby increasing the efficiency and effectiveness of our materials and process and usually improving the contrast and definition of the recorded image. These sensitizer materials include aryl ketones, such as benzophenone, 2-acetonaphthone, 9-acetylanthracene, benzoin, chlorobenzophenone, and benzil, and aryl amines and amides, such as diphenylamine and 1- naphthylamine, and benzamide, respectively. The aryl thioketones can be used, for example, 4,4'-bis-(dimethylamino)-thiobenzophenone and thioxanthone with the latter being the most preferred of all the sensitizers. The substituted derivatives of thioxanthone also are useful as sensitizers and include the halo and the lower alkyl derivatives.

When sensitized, our photographic materials become hypersensitive to wavelengths of light above approximately 3000 A. This increased sensitivity to wavelengths above 3000 A. is particularly useful when our photographic materials are to be employed as a photocopy sheet which receives the image to be copied through a glass plate because glass does not pass light below approximately 3000 A. (Jenkins and White state in their book Fundamentals of Optics that the limit of substantially complete transmission for crown glass is 3500–20,000 A. and for flint glass is 3800–25,000 A.) Our sensitized photograph materials, which are readily sensitive to the 3000 A. and above wavelengths passing through the glass, are unaffected by the precluded wavelengths and, hence, work ideally as photocopy sheets. Also, if a mercury arc light source is used, our sensitized photographic materials tend to be more efficient than our unsensitized because they are able to readily absorb the 3150 A. mercury line and the highly intense 3650 A. line of mercury.

A chemist having knowledge that such sensitizers are useful in the formation of hydrogen halide catalysts and the latter is useful for conjugation of linear polyketones can readily adapt our process to his own ends by series of routine experiments wherein all variables except one are held constant and the one varied until optimum conditions are established. This procedure is then followed for other variables, if needed, until the desired process is evolved.

Generally speaking, the rate of color formation at a given temperature is proportional to the polyketone concentration multiplied by the square of the hydrochloric acid concentration. Stated another way, the specific reaction rate for aldol condensation to form color at room temperature is approximately 0.32 optical density units per minute, as determined on a Beckman Model DK-2 Spectrophotometer in ultra-violet light, if the concentration of polymer is expressed in grams per liter and the concentration of acid is expressed in moles per liter. Generally speaking, an amount of hydrogen halide sufficient to develop our films at room temperature is not desirable and we prefer to adjust the exposure and hydrogen halide precursor concentration so that a temperature in excess of ambient room temperature is required for development of the image. More preferably, because development speed increases with increased temperature, development temperatures in excess of about 65° C. are utilized, and temperatures of about 100°–150° C. are still more preferable.

The development rate does not vary appreciably as the length of the polymer chain increases; for example, the rate remains constant for solutions of equal poly methyl isopropenyl ketone concentrations wherein the specific viscosity of the polymer is increased from about 0.4 to about 3.8.

The following examples more specifically illustrate my invention but it is not intended that my invention be limited to the particular hydrogen halide donors, exposure times, development times, etc.

*Example I*

A film of about 0.06 mm. thickness containing 50% by weight poly methyl isopropenyl ketone and 50% by weight of a co-polymer of vinylidene chloride and acrylonitrile (Saran F-220) was deposited on a glass slide from solution in methyl ethyl ketone and dried. The film was exposed to ultra-violet light from a 250 w. G.E. Uviarc No. 2 lamp at a distance of about 8 inches for 30 seconds and heated at 100° C. for 60 seconds. The American Standards Association diffuse transmission density, measured by a Macbeth Quantalog Transmission Densiometer using a "visual" filter, is 0.58.

*Example II*

An 0.04 mm. film was prepared on a glass slide utilizing 16.67% by weight poly methyl isopropenyl ketone; 16.67% by weight of a chlorinated paraffin (Halowax 4010A); 16.67% dioctylphthalate and 50% Saran F-220. The film was exposed to G.E. Uviarc No. 2 lamp for 30 seconds at a distance of eight inches and heated at 100° C. for 60 seconds to yield a fixed image having a diffuse transmission density of 0.51.

*Example III*

Following the procedure of Example I and II, a film of 25% poly methyl vinyl ketone, 15% Halowax 4010A, and 60% of a photodecomposable poly vinyl chloride (Geon 121) was deposited on a glass slide in solution in cyclohexanone and dried. The film was exposed to ultra-violet light for 30 seconds and heated at 100° C. for 30 seconds to yield an image having a diffuse transmission density of 0.40.

*Example IV*

For comparative purposes, 0.05 mm. films of 100% by weight Saran F-220 were deposited on glass from methyl ethyl ketone and were exposed for 0, 30 and 60 seconds to a 250 w. G.E. Uviarc No. 2 lamp at a distance of eight inches. These films were then heated at 130° C. for one minute. The diffuse transmission densities of these films were 0.05, 0.08, and 0.09, respectively. The A.S.A. diffuse transmission density scale is Logarithmic and a diffuse transmission density of 0.2 is required if the average human eye is to discern that an image exists on such a film.

*Example V*

A mixture of Geon 121 and Halowax 4010A yielded results comparable to those formed by Saran F-220 in Example IV.

*Example VI*

The addition of an aromatic amine to the described photosensitive systems improves the contrast and definition of the recorded image. Thus, a film containing 25% by weight poly methyl isopropenyl ketone; 50% of a co-polymer of vinylidene chloride and acrylonitrile, and 25% diphenylamine yields a markedly improved image having a diffuse transmission density of 1.9 on exposure to ultraviolet light for 15 seconds and on heating 150° C. for 120 seconds.

*Example VII*

Following the procedure of Example IV, a 2.9 diffuse transmission density image is obtained by substituting alpha-naphthylamine for the diphenylamine in the film of Example VI.

*Example VIII*

An 0.7 mm. film was prepared containing 75 mg. poly methyl isopropenyl ketone, 157 mg. Saran F-220, and 10 mg. carbon tetrabromide. The following table records exposure time and the resulting visual density.

Irradiation time:                 visual density
- 1 second _____ 0.08
- 5 seconds _____ 0.42
- 20 seconds _____ 1.38
- 1 minute _____ <4

*Example IX*

An 0.7 mm. film was prepared containing 250 mg. poly methyl isopropenyl ketone and 9 mg. carbon tetrabromide. On exposure to a G.E. Uviarc No. 2 lamp at eight inches for 5 seconds and heating at 130° C. for a few minutes, a visual density greater than 4 was obtained.

*Example X*

A film having poly vinyl ketone substituted for the polymer for poly methyl isopropenyl of Example I is prepared by the process of Example I. A desired image is obtained by exposing the film to light from a G.E. Uviarc No. 2 lamp for about 15 seconds heating the exposed film at 150° C. for 120 seconds.

*Example XI*

An 0.05 mm. film of methyl-2-chloro-1-vinyl ketone polymer can be deposited on a glass slide from solution as per Example I. On exposure to ultra-violet light and heat, a desired image is obtained.

*Examples XII and XIII*

Two films were prepared containing 250 mg. poly methyl isopropenyl ketone, 10 mg. triphenyl methane, and 10 mg. carbon tetrabromide. On selective exposure of both to a G.E. Uviarc No. 2 lamp at eight inches for one second and heating one of the films at 150° C., an image is developed in the film in approximately 3½ minutes. The other film was heated at 200° C. and an image formed in about 15 seconds. The visual density of both films was greater than 4.

*Example XIV*

A film was prepared containing 121 mg. poly methyl isopropenyl ketone, 10 mg. triphenyl methane, and 20 mg. carbon tetrabromide. On selective exposure to light at eight inches from the same type lamp as Examples XII and XIII and heating the exposed film at 130° C. for approximately 20 seconds, an image having a visual density of 2 was formed.

*Example XV*

The materials of Examples XII and XIII were used in preparing a film except 10 mg. bromotrichloromethane was substituted for 10 mg. carbon tetrabromide. The film, which was carried on a polyethylene terephthalate backing, was selectively irradiated under a G.E. Uviarc No. 2 lamp at eight inches for one second and then placed on Wood's metal bath to develop at 410° F. (210° C.). After eight minutes, an image was formed having a visual density of 0.7. The softening point of the polyethylene terephthalate, which was used as the backing, is above 240° C.

*Example XVI*

Following the procedure of Example XV with the exception that 10 mg. bromoform was substituted for the 10 mg. bromotrichloromethane, two films were prepared and tested. One was developed in three minutes and the other in four minutes. Both had visual densities greater than 3 with the density of the four minute-developed film being slightly higher.

*Examples XVII–XX*

A film was prepared containing 250 mg. poly methyl isopropenyl ketone, 10 mg. triphenyl methane, 10 mg. carbon tetrabromide, and 10 mg. thioxanthone. Four films of this composition were selectively exposed and the image developed under the following conditions:

| Film | Filter | Exposure Time, seconds | Development Time/Temp. | Visual Density |
|---|---|---|---|---|
| XVII | No | 1 | 29 seconds/410° F. (210° C.) | 3.1 |
| XVIII | No | 4 | 30 seconds/410° F. (210° C.) | 3.2 |
| XIX | 0-54 | 1 | 35 seconds/410° F. (210° C.) | 3.5 |
| XX | 0-52 | 8 | 40 seconds/410° F. (210° C.) | 3 |

A G.E. Uviarc No. 2 lamp at eight inches was used for exposure of the films and a Wood's metal bath was employed for developing the exposed films. The filters in Examples XIX and XX were Corning filters (manufactured by Corning Glass) having the following characteristics:

| Type filter | Wavelengths transmitted | 50% transmission at— | 85-90% trans. |
|---|---|---|---|
| 0-52 | above 3,400 A | 3,600 A | above 4,100 A. |
| 0-54 | above 3,000 A | 3,150 A | above 3,650 A. |

*Examples XXI–XXII*

For comparison purposes, two unsensitized films were prepared containing 250 mg. poly methyl isopropenyl ketone, 10 mg. triphenyl methane, and 10 mg. carbon tetrabromide and were selectively exposed and developed. A G.E. Uviarc No. 2 lamp at eight inches was used for exposure and a Wood's metal bath was employed for development of the exposed films. The exposure and development conditions and results obtained were as follows:

| Film | Filter | Exposure Time, seconds | Development Time/Temp. | Visual Density |
|---|---|---|---|---|
| XXI | No | 4 | 40 seconds/410° C. (210° C.) | 2 |
| XXII | 0-54 | 1 | 45 seconds/410° C. (210° C.) | 0.15 |

*Example XXIII*

Ten mg. of 9-acetylanthracene was substituted for the 10 mg. of thioxanthone of Examples XVII–XX in the preparation of a film. Following the procedure of those examples, the film was selectively irradiated for one second and heated for one minute to provide an image having a visual density of 2.

*Examples XXIV–XXV*

Ten mg. of 2-acetonaphthone was substituted for the 10 mg. of thioxanthone of Examples XVII–XX in the preparation of two films. A G.E. Uviarc No. 2 lamp at eight inches was used in the selective exposure of the films and a Wood's metal bath was employed for developing the exposed portions of the films. The two films were exposed and developed under the following conditions:

| Film | Filter | Exposure Time, seconds | Development Time/Temp. | Visual Density |
|---|---|---|---|---|
| XXIV | No | 1 | 30 seconds/410° F. (210° C.) | 3 |
| XXV | Glass plate. | 1 | 45 seconds/410° F. (210° C.) | 2.5 |

Only wavelengths above 3000 A. were transmitted by the glass plate in Example XXV.

Examples XXVI–XXXI

Six films containing 125 mg. poly methyl isopropenyl ketone, 7.5 mg. triphenyl methane and 7.5 mg. carbon tetrabromide. To each of these films, one of the below-listed unpurified sensitizers was added in an amount equal to 8–10% by weight of the poly methyl isopropenyl ketone. All six films were exposed to a G.E. Uviarc No. 2 lamp at eight inches for one second and heated at 200° C. for about 20 seconds.

|        | Sensitizer          | Visual Density |
|--------|---------------------|---------------|
| XXVI   | Benzophenone        | 1.0 |
| XXVII  | Diphenylamine       | 1.0 |
| XXVIII | Benzoin             | 0.2 |
| XXIX   | Benzamide           | 1.0 |
| XXX    | Benzil              | 0.3 |
| XXXI   | Chlorobenzophenone  | 1.0 |

Example XXXII

A film was prepared containing 250 mg. poly methyl isopropenyl ketone, 10 mg. carbon tetrabromide, 10 mg. triphenyl methane, and 2.5 mg. 4,4′-bis-(dimenthylamino)-thiobenzophenone under dark room conditions. Using a polyethylene terephthalate backing for supporting the film, the film was selectively irradiated under a G.E. Uviarc No. 2 lamp at eight inches for one second and a bluish image formed. Upon heating at 170° C. for one minute, the bluish image faded and was replaced by a denser, brownish image having a visual density of 2.5. The polyethylene terephthalate used as a backing has a softening point above 240° C.

Now, having described our invention, what we claim is:
1. A process comprising the sequential steps of:
   (1) selectively exposing to light a photographic material selected from the group consisting of:
     (a) a mixture of (1) at least one hydrogen halide precursor which decomposes on exposure to light to cause the formation of hydrogen halide, and
     (2) a linear polyketone having the repeating unit

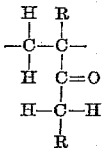

wherein R is selected from the group consisting of hydrogen and lower alkyl, and
     (b) a linear polyketone having the repeating unit

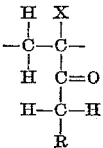

wherein X is halogen and R has the same meaning as above, and which decomposes on exposure to light to form hydrogen halide,
   said exposure of the photographic material being of sufficient time and intensity to cause the formation of hydrogen halide from the decomposition of said hydrogen halide precursor (a) (1) and from linear polyketone (b); and
   (2) heating said photographic material in the presence of said generated hydrogen halide at temperatures greater than ambient room temperature to cause aldol condensation of said polyketone in said exposed areas.
2. A process comprising the sequential steps of:
(1) selectively exposing to light a photographic material selected from the group consisting of:
   (a) a mixture of at least one hydrogen halide precursor which decomposes on exposure to light to form hydrogen halide, and a linear polyketone having the repeating unit

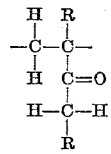

wherein R is selected from the group consisting of hydrogen and lower alkyl, and
   (b) a linear polyketone having the repeating unit

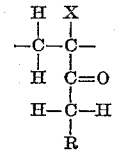

wherein X is halogen and R has the same meaning as above, and which decomposes on exposure to light to form hydrogen halide,
   said exposure of the photographic material lasting up to 60 seconds and being of an intensity sufficient to cause the formation of hydrogen halide; and
   (2) heating said photographic material in the presence of said generated hydrogen halide at temperatures greater than ambient room temperature to cause aldol condensation of said polyketone in said exposed areas.
3. The process of claim 2 in which the exposed material is heated to temperatures at least about 65° C.
4. A process comprising the sequential steps of:
(1) selectively exposing to light a photographic material comprising:
   a mixture of at least one hydrogen halide precursor which decomposes on exposure to light to cause the formation of hydrogen halide, and a polymer having the repeating unit

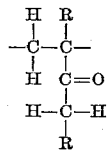

wherein R is selected from the group consisting of hydrogen and lower alkyl,
   said exposure of the photographic material being of sufficient time and intensity to cause the formation of hydrogen halide from decomposition of said hydrogen halide precursor; and
   (2) heating said photographic material in the presence of said generated hydrogen halide at temperatures greater than ambient room temperature to cause aldol condensation of said polyketone in said exposed areas.
5. The process of claim 4 wherein the photographic material is exposed up to 60 seconds.
6. A process comprising the sequential steps of:
(1) selectively exposing to light a photographic material comprising:
   a polymer having the repeating unit

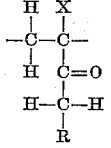

wherein X is halogen and R is selected from the group consisting of hydrogen and lower alkyl, and which decomposes on exposure to light to form hydrogen halide,
   said exposure of the photographic material being of sufficient time and intensity to dehydrohalogenate said linear polyketone; and (2) heating said photographic material in the presence of said generated hydrogen halide at temperatures greater than ambient room temperature to cause aldol condensation of said polyketone in said exposed areas.

7. A process comprising the sequential steps of:
(1) selectively exposing to light a photographic material selected from the group consisting of:
(a) a mixture of (1) at least one hydrogen halide precursor which decomposes on exposure to light to cause the formation of hydrogen halide, and (2) a linear polyketone having the repeating unit

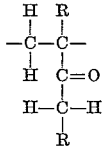

wherein R is selected from the group consisting of hydrogen and lower alkyl, and
(b) a linear polyketone having the repeating unit

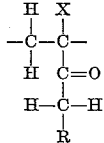

wherein X is halogen and R has the same meaning as above, and which decomposes on exposure to light to form hydrogen halide,
said photographic material including a sensitizer selected from the group consisting of 4,4'-bis-(dimethylamino) thiobenzophenone, benzophenone, 2-acetonaphthone, 9-acetylanthracene, benzoin, chlorobenzophenone, benzil, diphenylamine, 1-naphthylamine, benzamide, thioxanthone, halo-substituted thioxanthone, and lower alkyl thioxanthone, said exposure of the photographic material being of sufficient time and intensity to cause the formation of hydrogen halide from the decomposition of said hydrogen halide precursor (a) (1) and from linear polyketone (b); and
(2) heating said photographic material in the presence of said generated hydrogen halide at temperatures greater than ambient room temperature to cause aldol condensation of said polyketone in said exposed areas.

8. The process of claim 7 wherein the hydrogen halide precursor is selected from the group consisting of carbon tetrabromide, pentabromo ethane, bromoform, and the bromochloro derivatives of carbon tetrahalide.

9. A photographic material selected from the group consisting of:
(a) a mixture of at least one hydrogen halide precursor which decomposes on exposure to light to cause the formation of hydrogen halide, and a linear polyketone having the repeating unit

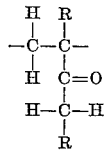

wherein R is selected from the group consisting of hydrogen and lower alkyl, and
(b) a linear polyketone having the repeating unit

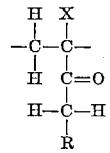

wherein X is halogen and R has the same meaning as above, and which decomposes on exposure to light to form hydrogen halide,
and including a sensitizer selected from the group consisting of 4,4'-bis(dimethylamino) thiobenzophenone, benzophenone, 2-acetonapthone, 9-acetylanthracene, benzoin, chlorobenzophenone, benzil, diphenylamine, 1-naphthylamine, benzamide, thioxanthone, halo-substituted thioxanthone, and lower alkyl thioxanthone.

10. The photographic material of claim 9 wherein said sensitizer is thioxanthone.

11. The photographic material of claim 9 wherein said sensitizer is 2-acetonaphthone.

12. The photographic material of claim 9 wherein said sensitizer is 9-acetylanthracene.

13. A photographic material comprising:
a mixture of at least one hydrogen halide precursor which decomposes on exposure to light to cause the formation of hydrogen halide, and a linear polyketone having the repeating unit

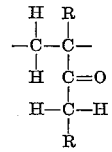

wherein R is selected from the group consisting of hydrogen and lower alkyl,
and including a sensitizer selected from the group consisting of 4,4'-bis-(dimethylamino) thiobenzophenone, benzophenone, 2-acetonaphthone, 9-acetylanthracene, benzoin, chlorobenzophenone, benzil, diphenylamine, 1-naphthylamine, benzamide, thioxanthone, halo-substituted thioxanthone, and lower alkyl thioxanthone.

14. The photographic material of claim 13 wherein said sensitizer is thioxanthone.

15. The photographic material of claim 13 wherein said sensitizer is 2-acetonaphthone.

16. The photographic material of claim 13 wherein said sensitizer is 9-acetylanthracene.

17. A photographic material comprising:
a mixture of at least one hydrogen halide precursor selected from the group consisting of carbon tetrabromide, pentabromo ethane, bromoform, and the bromo-chloro derivatives of carbon tetrahalide, which decomposes on exposure to light to cause the formation of halide free radicals, a hydrogen donating compound having a hydrogen which is easily extractible by a halide free radical to form hydrogen halide, and a linear polyketone having the repeating unit

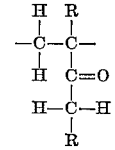

wherein R is selected from the group consisting of hydrogen and lower alkyl.

18. The photographic material of claim 17 wherein said hydrogen halide precursor is carbon tetrabromide and said hydrogen donating compound is triphenyl methane.

References Cited by the Examiner

UNITED STATES PATENTS

| | | | |
|---|---|---|---|
| 2,333,633 | 11/1943 | Britton et al. | 260—63 X |
| 2,484,529 | 9/1949 | Roedel | 260—63 X |
| 2,690,966 | 1/1951 | Minsk et al. | 96—115 |
| 2,789,053 | 4/1957 | Elliott | 96—115 |
| 3,042,517 | 7/1962 | Wainer | 96—115 X |

NORMAN G. TORCHIN, *Primary Examiner.*

ALEXANDER D. RICCI, *Examiner.*

C. BOWERS, *Assistant Examiner.*